(12) United States Patent
Fujita et al.

(10) Patent No.: US 9,308,862 B2
(45) Date of Patent: Apr. 12, 2016

(54) DRIVE ASSISTANCE DEVICE

(75) Inventors: Hideto Fujita, Yao (JP); Yohei Ishii, Osaka (JP); Hitoshi Hongo, Shijonawate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1687 days.

(21) Appl. No.: 12/294,829

(22) PCT Filed: Mar. 23, 2007

(86) PCT No.: PCT/JP2007/057019
§ 371 (c)(1),
(2), (4) Date: Sep. 26, 2008

(87) PCT Pub. No.: WO2007/111377
PCT Pub. Date: Oct. 4, 2007

(65) Prior Publication Data
US 2010/0165104 A1 Jul. 1, 2010

(30) Foreign Application Priority Data
Mar. 27, 2006 (JP) .................. 2006-086476

(51) Int. Cl.
*H04N 7/18* (2006.01)
*B60R 1/00* (2006.01)
*G06T 3/00* (2006.01)
(Continued)

(52) U.S. Cl.
CPC ... *B60R 1/00* (2013.01); *G06T 3/00* (2013.01); *G06T 3/0018* (2013.01); *G06T 5/006* (2013.01); *B60R 2300/30* (2013.01); *B60R 2300/402* (2013.01); *H04N 5/3572* (2013.01)

(58) Field of Classification Search
CPC .......... G06T 3/0018; G06T 5/006; B60R 1/00
USPC ........................................ 348/148, 252, 746
See application file for complete search history.

(56) References Cited

U.S. PATENT DOCUMENTS 5,369,450 A * 11/1994 Haseltine et al. ............. 348/745
5,729,216 A * 3/1998 Sasaki et al. .................. 340/937
6,211,911 B1 * 4/2001 Komiya et al. ............ 348/218.1
(Continued)

FOREIGN PATENT DOCUMENTS

JP 07-186833 7/1995
JP 3047581 B2 3/2000
(Continued)

OTHER PUBLICATIONS

Notification Concerning Tranmittal of IPRP (PCT/IB/326).
(Continued)

*Primary Examiner* — Hua Fan
(74) *Attorney, Agent, or Firm* — NDQ&M Watchstone LLP

(57) ABSTRACT

A drive assistance device has an imaging device (1) mounted on a vehicle body and imaging a region surrounding the vehicle body, lens distortion correction means (2) for performing lens distortion correction for an inputted image taken by the imaging device (1), and a display (3) for displaying the image obtained by the lens distortion correcting means (2). The lens distortion correction means (2) divides the inputted image into multiple regions and performs lens distortion correction for each of the regions with different distortion correction level.

5 Claims, 12 Drawing Sheets

(51) Int. Cl.
*G06T 5/00* (2006.01)
*H04N 5/357* (2011.01)

(56) References Cited

U.S. PATENT DOCUMENTS

| | | | |
|---|---|---|---|
| 6,584,287 B2 * | 6/2003 | Enomoto | 396/311 |
| 6,704,434 B1 * | 3/2004 | Sakoh et al. | 382/104 |
| 6,785,404 B1 * | 8/2004 | Shimazaki et al. | 382/104 |
| 6,801,334 B1 * | 10/2004 | Enomoto | 358/1.18 |
| 6,985,171 B1 * | 1/2006 | Kuriya et al. | 348/148 |
| 7,002,589 B2 * | 2/2006 | Deering | 345/581 |
| 7,012,548 B2 * | 3/2006 | Ishii et al. | 340/932.2 |
| 7,058,235 B2 * | 6/2006 | Wakamoto et al. | 382/275 |
| 7,161,616 B1 * | 1/2007 | Okamoto et al. | 348/148 |
| 7,248,287 B1 * | 7/2007 | Sogawa et al. | 348/208.99 |
| 7,256,799 B2 * | 8/2007 | Hatanaka et al. | 345/629 |
| 7,307,655 B1 * | 12/2007 | Okamoto et al. | 348/222.1 |
| 7,366,595 B1 * | 4/2008 | Shimizu et al. | 701/301 |
| 7,458,737 B2 * | 12/2008 | Isono | 396/439 |
| 7,576,639 B2 * | 8/2009 | Boyles et al. | 340/435 |
| 7,596,286 B2 * | 9/2009 | Nose et al. | 382/300 |
| 8,125,537 B2 * | 2/2012 | Maekawa | 348/231.2 |
| 2002/0051639 A1 * | 5/2002 | Enomoto | 396/311 |
| 2002/0145663 A1 * | 10/2002 | Mizusawa et al. | 348/118 |
| 2003/0043303 A1 * | 3/2003 | Karuta et al. | 348/744 |
| 2003/0072083 A1 * | 4/2003 | Smith | 359/619 |
| 2003/0189730 A1 * | 10/2003 | Enomoto | 358/3.26 |
| 2005/0259158 A1 * | 11/2005 | Jacob et al. | 348/218.1 |
| 2007/0229238 A1 * | 10/2007 | Boyles et al. | 340/435 |
| 2008/0036866 A1 * | 2/2008 | Sogawa et al. | 348/187 |

FOREIGN PATENT DOCUMENTS

| | | |
|---|---|---|
| JP | 3286306 B2 | 3/2002 |
| JP | 2002-140703 | 5/2002 |
| JP | 2003-123064 A | 4/2003 |
| JP | 3446277 B2 | 7/2003 |
| JP | 3446991 B2 | 7/2003 |
| JP | 3451017 B2 | 7/2003 |
| JP | 3483143 B2 | 10/2003 |
| JP | 3565749 B2 | 6/2004 |
| JP | 3624769 B2 | 12/2004 |
| JP | 3632563 B2 | 1/2005 |
| JP | 2005-311666 | 11/2005 |

OTHER PUBLICATIONS

Notification of Transmittal of Translation of the IPRP (PCT/IB/338).
International Preliminary Report on Patentability (PCT/IB/373).
Written Opinion of the International Searching Authority (PCT/ISA/237).
Free Encyclopedia, Wikipedia, Photographic Lenses.
Advanced Technique of Digital Cameras, Technical Information Institute Co., Ltd., Chapter 4, Lens-Optical System Design, pp. 299-343.
Tsai, IEEE Journal of Robotics and Automation, vol. RA-3, No. 4, pp. 323-344, Aug. 1987.
Asada, "Computer Vision: Technical Review and Future Prospects," Chapter 3: Camera Calibration, pp. 37-53, Jun. 1998.
Zhang, "Flexible Camera Calibration by Viewing a Plane from Unknown Orientations," IEEE, 1999.
Zhang, "A Flexible New Technique for Camera Calibration," IEEE Transactions on Pattern Analysis and Machine Intelligence, vol. 22, No, 11, pp. 1330-1334, Nov. 2000.
OpenCV Reference Manual, 3D Reconstruction, Camera Calibration, pp. 6-1 to 6-3.
Guan et al., "Digital Image Correcting Method for Digital Camera," Ricoh Technical Report No. 31, pp. 103-110, Dec. 2005.
Suzuki, Accessory for Every Wagon Select View Backeye Camera, http://www.suzuki.co.jp/release/d/d050826b.htm.
EPO Communication, European Application No. 07740457.2, dated Oct. 25, 2011, pp. 1-6.

* cited by examiner

DRIVE ASSISTANCE DEVICE

TECHNICAL FIELD

The present invention relates to a drive assistance device.

BACKGROUND TECHNIQUE

1. Onboard Camera

A vehicle is increasingly generally equipped with a camera eliminating blind spots from the driver's position and improving visibility. It is said that the number of shipped cameras for visual recognition exceeds the two-million mark in 2006. The domestic sales number of new cars including trucks is a little less than six millions a year, and hence it follows that every third vehicle is mounted with a camera for visual recognition.

Cameras for visual recognition include (1) a rear camera displaying an image at the rear of the vehicle when the vehicle is reversed, (2) a front-side camera displaying an image of the front wheel portion opposite to the driver, (3) a front camera for visually recognizing a blind spot immediately in front of the vehicle, and (4) a side-blind camera displaying an image of a side blind spot formed when the vehicle is started from a narrow alley or the like. At present, the rear camera occupies 77% of the cameras for visual recognition and forms the mainstream.

In an onboard camera for visual recognition, a wide-angle optical system is generally employed in order to minimize the range of blind spots. In the rear camera, the angle of a horizontal plane exceeds 100 degrees. Large "barrel" distortion aberration takes place in an image picked up by the onboard camera including such an optical system. Due to this distortion, it is hard for the driver to intuitively recognize the position of an obstacle appearing in the image and a feeling for the distance thereto.

2. Distortion Correction 2.1 Technique of Lens Distortion Correction by Optical Processing In general, there are two methods for correcting barrel distortion. The first one is a method of suppressing distortion by devising the structure of the optical system, and the second one is a method of digitally correcting an image after picking up the image.

Optical distortion correction is implemented by devising the structure of the optical system with an aspherical lens or the like, as described in Non-Patent Documents 1 and 2.

Non-Patent Document 1: Free Encyclopedia "Wikipedia", Section of Photographic Lenses Non-Patent Document 2: Advanced Technique of Digital Cameras, Chapter 4 Lens•Optical System Design, Technical Information Institute, Co., Ltd.

However, distortion aberration increases in proportion to about the cube of the angle of view, and it is difficult in a wide-angle optical system employed for the onboard camera to completely correct the distortion by merely devising the optical system. Further, the degree of correction is decided in the design stage of the optical system, and it is difficult to adjust the degree of distortion on the part of the user. In addition, the aspherical lens is produced with a mold, and hence the initial investment disadvantageously increases.

2.2 Technique of Lens Distortion Correction by Image Processing

As a technique of correcting lens distortion of a camera by image processing, the technique of Tsai (refer to Non-Patent Documents 3 and 4) and the algorithm proposed by Zhengyou Zhang (refer to Non-Patent Documents 5 and 6) are commonly employed. This technique is proposed also as a library packaged as a computer program (refer to Non-Patent Document 7), and can be utilized also for distortion correction in the present invention.

Non-Patent Document 3: R. Y. Tsai: A versatile camera calibration technique for high-accuracy 3D machine vision metrology using off-the-shelf TV camera and lenses; IEEE Journal of Robotics and Automation, RA-3, 4, pp. 323-344 (1987).

Non-Patent Document 4: Computer Vision: Technical Review and Future Prospects, June 1998, Naoki Asada Non-Patent Document 5: Z. Zhang. "Flexible Camera Calibration By Viewing a Plane from Unknown Orientations", Proc. Of ICCV '99, pp 666-673, 1999.

Non-Patent Document 6: Z. Zhang. "A Flexible New Technique for Camera Calibration", IEEE, PAMI 22(11), pp 1130-1134, 2000.

Non-Patent Document 7: OpenCV Reference Manual, 6 3D Reconstruction [Camera Calibration], pp. 6_1-6_3.

According to the provided library, a plurality of images obtained by shooting a regular known pattern present on a plane as shown in FIG. 1 while changing the relative relation between the camera and the plane are employed for calculating four parameters ($k_1$, $k_2$, $p_1$ and $p_2$) for performing distortion correction of the camera. These are parameters for controlling distortion correction level. The distortion correction level increases as the values of these parameters increase.

With these parameters, the association between the coordinate positions (x', y') of an acquired image and the coordinate values (x, y) after distortion correction can be obtained through the following expressions (1). In this case, the coordinate positions are expressed in a coordinate system taking the x-coordinates in the horizontal direction and taking the y-coordinates in the vertical direction with the origin set at the center of the image. In the expressions (1), $r^2 = x^2 + y^2$.

$$x' = x + x(k_1 r^2 + k_2 r^4) + 2p_1 xy + p_2(r^2 + 2x^2)$$

$$y' = y(k_1 r^2 + k_2 r^4) + 2p_1 xy + p_2(r^2 + 2y^2) \quad (1)$$

FIGS. 2A 2B and 2C are schematic diagrams showing examples of images obtained by performing distortion correction with the aforementioned technique. FIG. 2A shows an original image obtained by shooting the known pattern of FIG. 1, FIG. 2B shows a distortion-corrected total image, and FIG. 2C shows a distortion-corrected cutout image. When a wide-angle camera is employed, barrel distortion generally takes place as in the original image, and correction of the distortion results in an image such as the "distortion-corrected total image" having four stretching portions at the corners of the rectangle. Further, conversion for expanding distorted portions is basically performed, and hence the size of the image is larger than that of the original image.

In general, the "distortion-corrected cutout image" obtained by cutting out a rectangular region (region surrounded by a rectangular frame of broken lines in FIG. 2B) from the "distortion-corrected total image" is frequently employed for display, due to such a determination that these images are reduced in visibility. When the internal rectangular region is cut out from the "distortion-corrected total image", the four portions at the corners of the image stretching in the distortion correction are discarded, and hence it follows that part of information having been acquired in the original image is not displayed. Therefore, the information content of the whole image is reduced, although the visibility of the observer may be improved. In the distortion correction and the cutout, processing such as enlargement or reduction may accompany in response to the image resolution of the display system.

A method of preparing a correction table (look-up table) previously associating addresses before and after correction and converting the addresses of pixels according to this lookup table is conceivable as means for performing distortion correction with hardware. Distortion has a two-dimensional shape and corrected pixel addresses do not necessarily correspond to uncorrected integral addresses, and hence a frame memory storing input images for one screen and an interpolation arithmetic circuit interpolating the pixels are required, to disadvantageously increase the circuit scale.

Patent Document 1 proposes a technique of performing distortion correction with a line memory and an interpolation circuit for two pixels by performing the distortion correction with respect to the horizontal direction. Patent Document 2 proposes a technique of successively processing the X-axis and the Y-axis of an image in two stages, in order to simplify the structure of an interpolation circuit and avoid lacks on the four corners of the image resulting from distortion correction. In each of these Patent Documents 1 and 2, the main object is simplification of the circuit, and there is no idea of controlling the level of distortion correction in order to improve observability of the user.

Patent Document 1: Japanese Patent No. 3047581 "Image Distortion Correction Method and Device" distortion correction with a line memory Patent Document 2: Japanese Patent No. 3451017 "Image Processing Method and Device" distortion correction in horizontal and vertical two stages Also with an object of correcting distortion of a digital camera, digital distortion correction is proposed (refer to Non-Patent Document 8). According to the digital distortion correction, it is possible to change the level of distortion and to improve the accuracy of the distortion correction by converting parameters for the distortion correction. In this case, however, the object is to uniformly reduce distortion point-symmetrically distributed about an optical axis.

Non-Patent Document 8: "Digital Image Correcting Method for Digital Camera", Ricoh Technical Report No. 31 (December, 2005) http://www.ricoh.co.jp/about/business_overview/report/31/pdf/A3114.pdf 3. Distortion Correction/Image Conversion of Onboard Camera Also as to an onboard camera, there are various proposals for facilitating visual recognition of the driver.

Patent Document 3 proposes distortion correction preserving a feeling for the distance by supplying loose distortion in the longitudinal and lateral directions on the assumption that complete correction of distortion is not necessarily advantageous for improvement of recognizability (particularly the feeling for the distance) of the driver. The principal object of this proposal is the improvement of the recognizability, and there is no idea of preserving the angle of view. Further, only loose conversion of distortion is described, and there is no concept of changing the level of distortion correction by dividing an image into regions.

Patent Document 3: Japanese Unexamined Patent Publication No. 2003-123064 "Image Conversion Device and Image Pickup and/or Display Device provided with the Same"

Patent Document 4 proposes a technique of extracting and enlargedly displaying a hitch portion in a vehicle having the hitch for pulling a trailer. This proposal proposes a technique of simultaneously displaying the hitch portion and a wide-range angle image as different images, and there is no concept of controlling the level of distortion correction.

Patent Document 4: Japanese Patent No. 3483143 "Drive Assistance Device"

Patent Document 5 proposes a technique of partially extracting an image of a noted region and simultaneously correcting distortion in a camera picking up an image at a wide angle of not less than 90 degrees. This proposal is equivalent to a technique of extracting an image after uniformly performing distortion correction, and there is no concept of controlling the level of distortion correction.

Patent Document 5: Japanese Patent No. 3446277 "Ambient Situation Display for Vehicle"

Patent Document 6 proposes a technique of optically supplying loose distortion correction by employing a prismatic optical member. Also in this proposal, only a technique of loosely changing distortion is described, and there is no concept of changing the level of distortion correction by dividing an image into regions. Further, the level of distortion correction cannot be changed after designing the optical system due to the optical distortion correction, and there is no concept of adjusting the correction level in response to the loaded state on the vehicle.

Patent Document 6: Japanese Patent No. 3446991 "Monitor"

In order to render the attitude of a vehicle and the ambient situation easily graspable, a method of virtually converting the position and the angle of a camera is proposed.

Patent Document 7 proposes a technique of reducing the difference between appearances of regions close to and far from the vehicle respectively by virtually converting the mounting height of a rear camera of the vehicle and reducing a reflection of the bumper forming an unnecessary region in the visual field by virtually converting the mounting position of the camera in the anteroposterior direction.

Patent Document 7: Japanese Patent No. 3624769 "Image Conversion Device for Rear Monitor for Vehicle"

In a back camera (refer to Non-Patent Document 9) employed as an option of a domestic automobile maker or Patent Document 8, the camera is virtually directed vertically downward, thereby recognizably displaying the positional relation between parking lines on a road and the user's vehicle. The principal objects of these proposals are improvement of recognizability, and the angle of view is sacrificed.

Non-Patent Document 9: Suzuki Accessory for Every Wagon Select View Backeye Camera http://www.suzuki-accessory.jp/every/navi/99020_b14.html Patent Document 8: Japanese Patent No. 3286306 "Image Forming Device, Image Forming Method"

In order to correctly display side extensions and an expected course line, accuracy in camera mounting on the vehicle body is required. The accuracy of camera mounting is important also in a high-function camera performing the aforementioned coordinate conversion of images. A technique of adjusting and inspecting mounting of the camera is also important.

Patent Document 9 proposes a technique of comparing a reference test pattern set on a prescribed position in front of a vehicle and a determination pattern displayed on a prescribed position of a shot image in order to indicate whether or not the angle of a mounted camera is within a range allowing fine adjustment by image conversion or a method of adjusting the angle to the operator. This Patent pays attention to only angle adjustment of the camera, and there is no concept of adjusting a distortion coefficient.

Patent Document 9: Japanese Patent No. 3565749 "Test Method for Image Pickup Direction of Onboard Camera and Test Device Thereof"

Patent Document 10 proposes a technique of comparing a test pattern set on a prescribed position in front of a camera and an ideal image pickup position for the test pattern calculated from a reference position decided as a design value with respect to a vehicle with each other in order to correct the mounting position and the angle of the camera and deviation of a lens optical axis. While this Patent proposes calculation of camera parameters including a distortion coefficient from deviation between an actual image pickup position and the ideal image pickup position for the test pattern, there is no proposal for adjusting the distortion coefficient.

Patent Document 10: Japanese Patent No. 3632563 "Image Positional Relation Correcting Device, Steering Assistance Device comprising the Image Positional Relation Correcting Device, and Image Positional Relation Correcting Method"

As hereinabove described, the onboard camera generally has large lens distortion due to the employment of a wide-angle optical system. It is common to set a camera position so that the vehicle body is reflected in a part of an image as shown in FIG. 3, so that obstacles close to the vehicle body and the user's vehicle can be grasped at the same time. In the example of FIG. 3 showing an image of a car park, a rear bumper (denoted by 100 in FIG. 3) is reflected as apart of the vehicle body. While the vehicle body must be partially reflected, it follows that the vehicle body occupies a large region of the image if lens distortion is remarkable. In addition to the lens distortion, the mounting position of the camera is frequently offset from the center of the vehicle, and it is further difficult to detect the optimum camera position.

In distortion correction of a digital system, it is possible to generally completely correct lens distortion. FIG. 4 shows an image after distortion correction. In this case, the end of the vehicle body is hardly distorted, and such a disadvantage that the vehicle body is excessively largely reflected is dissolved. However, it follows that diagonal information is lost due to the solution of the distortion. The diagonal information denotes information on regions on both sides of the upper visual field of the camera, and corresponds to information on the upper right and upper left portions in FIG. 3. For example, information of the vehicle on the upper right of FIG. 3 is lost, as shown by broken lines in FIG. 4.

Whether or not the diagonal angle of view is important depends on the setting of the camera with respect to the vehicle body. The upper visual field of the camera picks up an image of the road surface if the camera has a large angle of depression. In this case, the road surface, having a possibility of including obstacles such as persons and vehicles interfering with the user's vehicle, is an important region. It is unpreferable that the diagonal information is lost due to the distortion correction. If the camera has a small angle of depression, the upper visual field of the camera is above the road surface. In this case, there is a small possibility that obstacles interfering with the user's vehicle are present, and the driver can directly visually recognize such obstacles in general. In the case of such camera setting, it is possible to apply distortion correction by attaching more importance to distortion than the diagonal information.

An object of the present invention is to provide a drive assistance device capable of dividing an input image into a plurality of regions and varying distortion correction level with the regions when performing lens distortion correction on the input image.

DISCLOSURE OF THE INVENTION

The drive assistance device according to the present invention includes an imaging device mounted on a vehicle body for imaging a region surrounding the vehicle body, lens distortion correction means for performing lens distortion correction on an input image picked up by the imaging device, and a display for displaying the image obtained by the lens distortion correction means, while the lens distortion correction means divides the input image into a plurality of regions, and performs lens distortion correction with distortion correction level varying with the regions.

As the aforementioned lens distortion correction means, that dividing the input image into the plurality of regions in response to the distance from the vehicle body and/or the angle of depression of a camera and performing lens distortion correction with the distortion correction level varying with the regions may be employed, for example.

Region setting means for setting the plurality of regions and distortion correction level decision means for deciding the distortion correction level every region set by the region setting means may be provided, and the aforementioned lens distortion correction means may perform lens distortion correction responsive to the distortion correction level decided by the distortion correction level decision means every region on the input image.

Temporary region setting means for temporarily setting the plurality of regions, temporary distortion correction level decision means for temporarily deciding distortion correction level every region temporarily set by the temporary region setting means, means for displaying an effect of distortion correction responsive to the distortion correction level temporarily decided by the temporary distortion correction level decision means every region on the display with grid lines, and formal setting means for formally setting the distortion correction level temporarily decided by the temporary distortion correction level decision means every region as intrinsic distortion correction level every region may be provided, and the aforementioned lens distortion correction means may perform lens distortion correction responsive to the distortion correction level formally set by the formal setting means every region on the input image.

BEST MODE FOR CARRYING OUT THE INVENTION

First, the basic idea of the present invention is described. According to the present invention, an image region is divided into regions of a vehicle body portion, a portion close to the vehicle body and a distant portion, and lens distortion correction is performed with distortion correction level parameters previously set every region.

Figure 1:
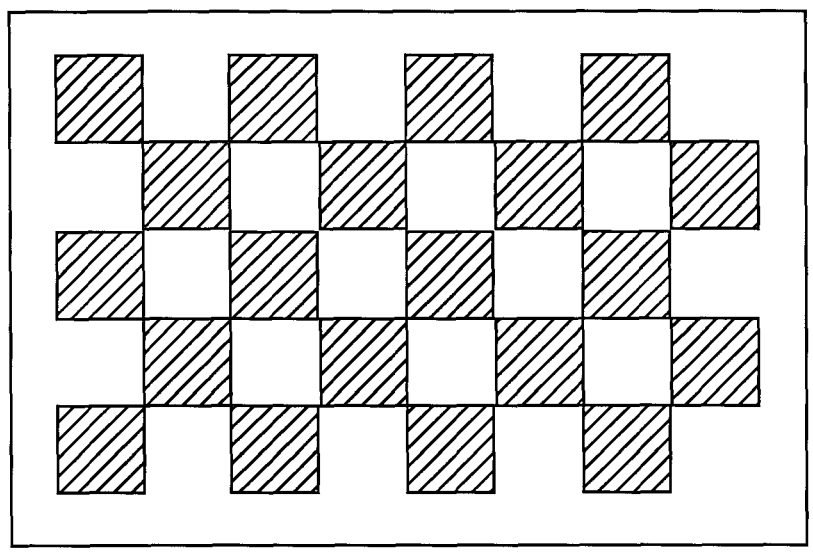
FIG. 1 is an explanatory diagram for illustrating a technique of correcting lens distortion of a camera by image processing.
Figure 2A:
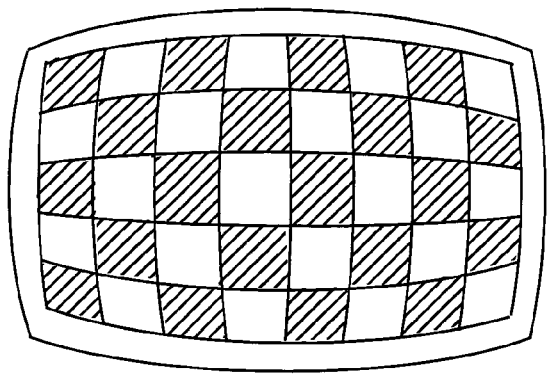
FIGS. 2A, 2B and 2C are schematic diagrams showing examples of images subjected to lens distortion correction.
Figure 2B:
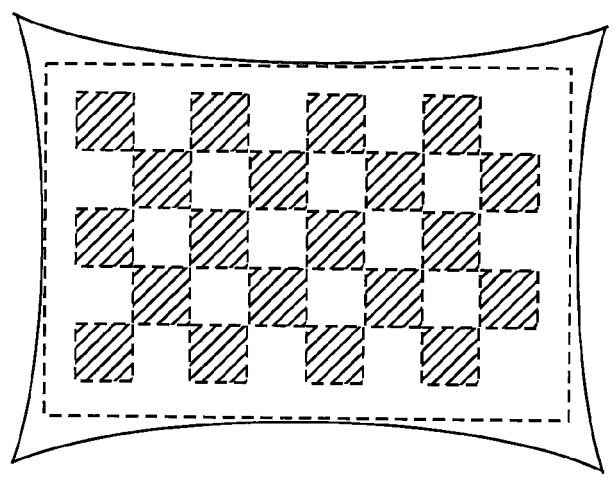
Figure 2C:
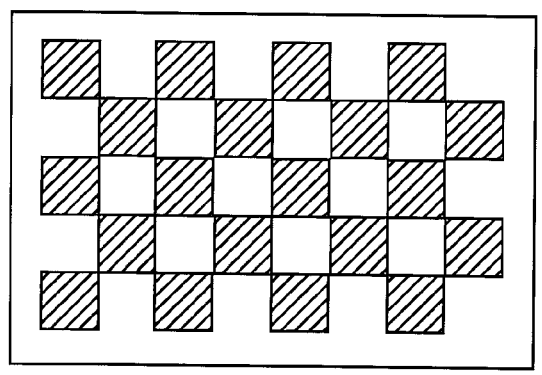
Figure 3:
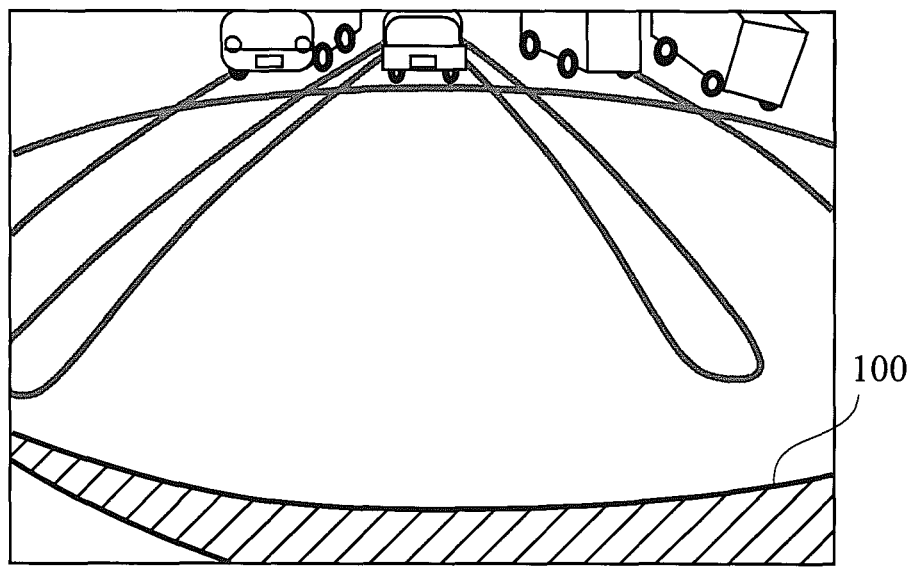
FIG. 3 is a schematic diagram showing an example of an image picked up by an onboard camera.
Figure 4:
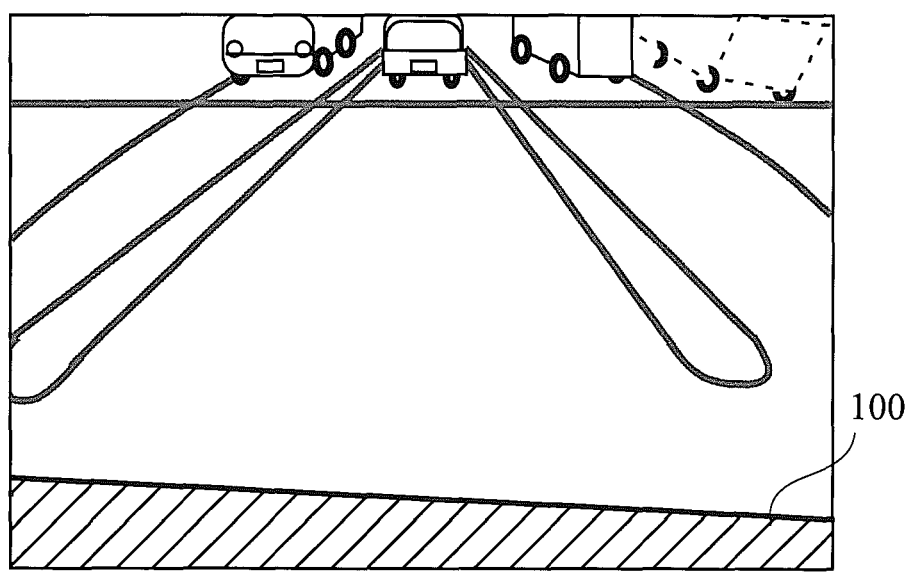
FIG. 4 is a schematic diagram showing an image after lens distortion correction on the image of FIG. 3.
Figure 5:
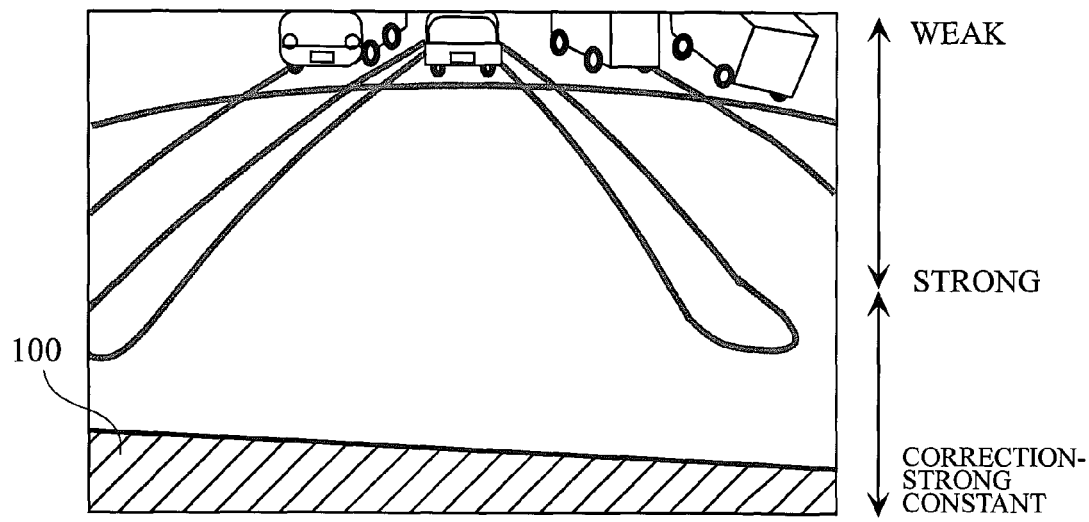
FIG. 5 is a schematic diagram showing an example applying a strong level of distortion correction to a vehicle body portion and a portion close to the vehicle body and applying lens distortion correction so that the level of correction is weakened as separated from the vehicle body in a distant portion.

FIG. 5 shows an example applying a strong level of lens distortion correction to the vehicle body portion and the portion around the vehicle body while applying lens distortion correction so that the level of correction is weakened as separated from the vehicle body in the distant portion. The strong level of lens distortion correction is applied to the vehicle body portion and the portion around the vehicle body, whereby the end of the vehicle body is correctly displayed in a straight line. In the distant portion, the lens distortion correction is weak and hence the diagonal information content is preserved although lens distortion remains. The lens distortion correction shown in FIG. 5 is employed in a case where the diagonal information is not much important such that the camera has a small angle of depression.

Figure 6:
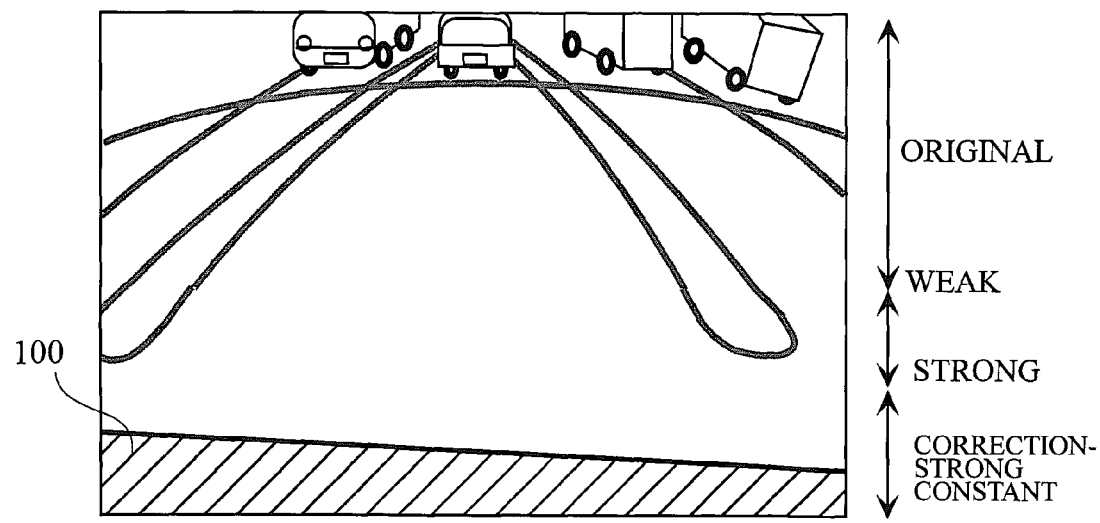
FIG. 6 is a schematic diagram showing an example applying a strong level of lens distortion correction to the vehicle body portion, applying lens distortion correction so that the level of correction is weakened as separated from the vehicle body in the portion close to the vehicle and performing no lens distortion correction in the distant portion.

A strong level of lens distortion correction may be applied to the vehicle body portion, lens distortion correction may be applied so that the level of correction is weakened as separated from the vehicle body in the portion close to the vehicle body, and no lens distortion correction may be performed in the distant portion, as shown in FIG. 6. The lens distortion correction shown in FIG. 6 is employed in a case where the diagonal information is important such that the camera has a large angle of depression.

Examples in a case of performing lens distortion correction on an input image with the distribution of the distortion correction level shown in FIG. 6 are now described.

[1] Example 1

Figure 7:
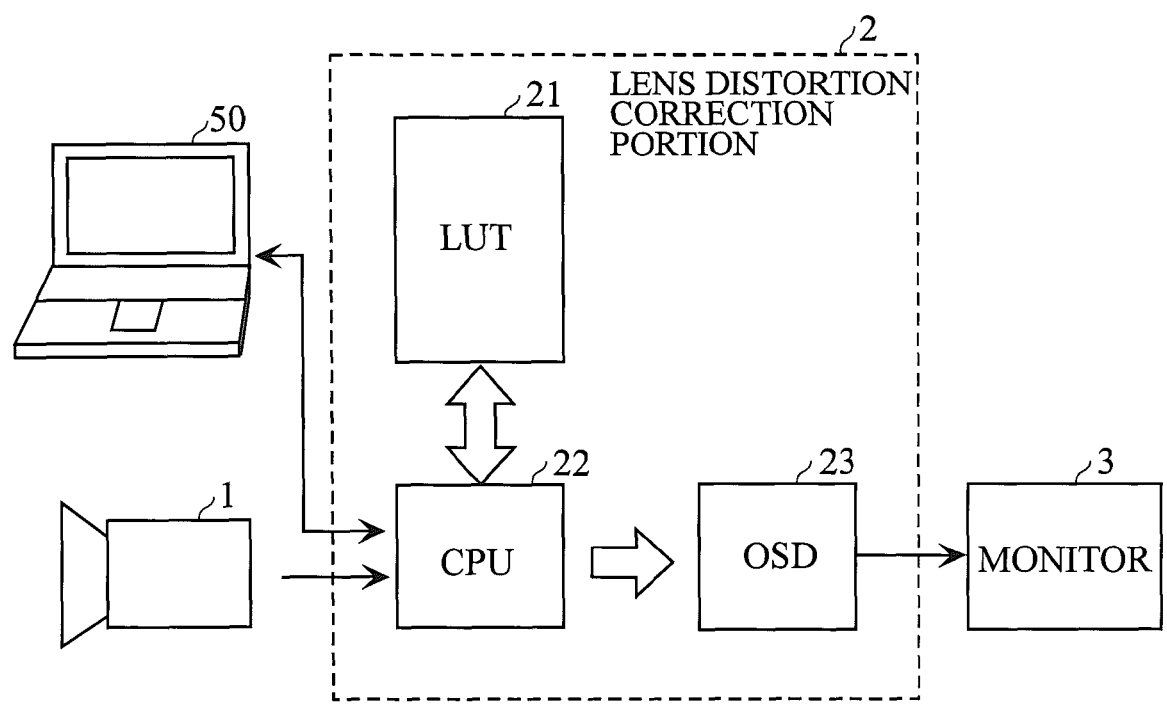
FIG. 7 is a block diagram showing the structure of a drive assistance device.

FIG. 7 shows the structure of a drive assistance device.

The drive assistance device includes a camera 1 inputting an image, a lens distortion correction portion 2 and a monitor 3 displaying the image. While the lens distortion correction portion 2 is independent of the camera 1 or the monitor 3 in this example, the same may be integrated with the camera 1, or may be integrated with the monitor 3. In this example, a rear camera picking up a rear image of a vehicle is employed as the camera 1. In this Example, a calibration PC 50 is employed as a tool adjusting the level of lens distortion correction.

The lens distortion correction portion 2 includes an LUT (look-up table) 21 storing association between the coordinates of an input image and an output image and a CPU 22 calculating a lens distortion corrected image on the basis of the LUT 21. The lens distortion correction portion 2 further includes an OSD (on-screen display) circuit 23 for recognizably displaying the distribution of distortion correction level (effect of lens distortion correction) on the image, as illustrated with reference to Example 2 described later. The CPU 22 is also in charge of a display instruction to the OSD circuit 23 and an interface with the PC 50.

Figure 8:
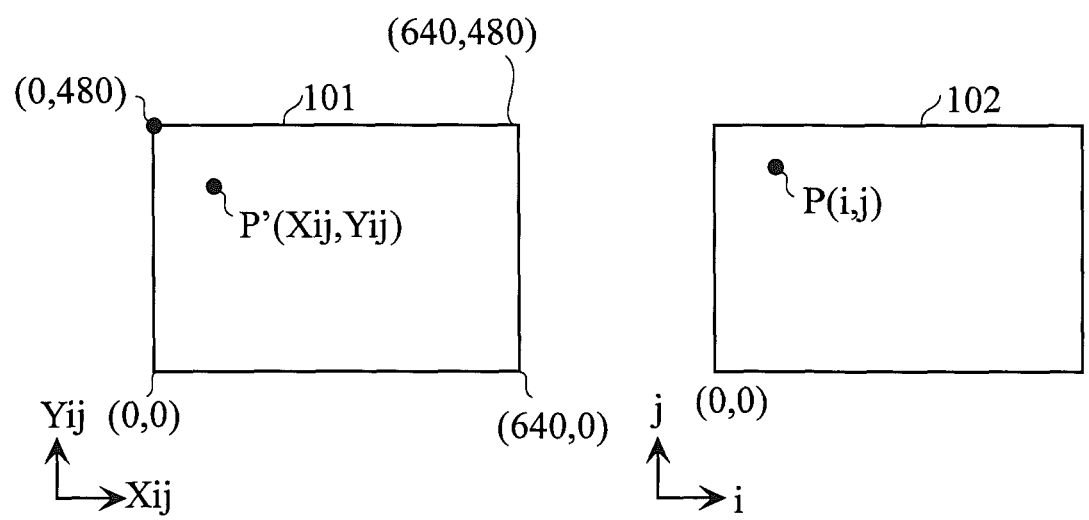
FIG. 8 is a schematic diagram for illustrating the outline of a lens distortion correction technique with an LUT 21.

FIG. 8 shows the outline of the distortion correction technique with the LUT 21.

The left side of FIG. 8 shows an input image (distorted image) 101, and the right side of FIG. 8 shows an output image (distortion-corrected image) 102. With respect to the input image, the origin (0, 0) is taken at the lower left of the input image, while x-coordinates are set on the axis of abscissas, and y-coordinates are set on the axis of ordinates. With respect to the output image, the origin (0, 0) is taken at the lower left of the output image, while i-coordinates are set on the axis of abscissas, and j-coordinates are set on the axis of ordinates. A pixel position $P'(X_{i,j}, Y_{i,j})$ of an original image referred to for acquiring a pixel value on a certain pixel position P(i, j) of the output image 102 is held in the format of the look-up table.

Figure 9A:
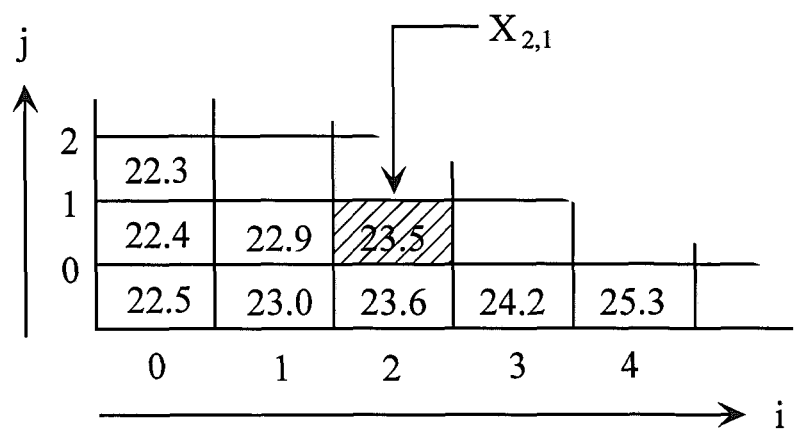
FIGS. 9A and 9B are schematic diagrams showing structural examples of the LUT 21.
Figure 9B:
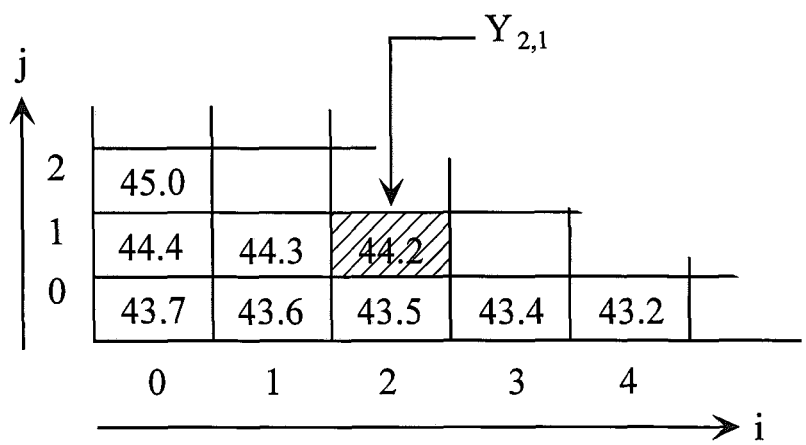

FIGS. 9A and 9B show structural examples of the LUT 21.

Referring to FIGS. 9A and 9B, LUTS are held with respect to x-coordinates and y-coordinates respectively, with respect to each pixel position in the output image. FIG. 9A shows an LUT storing the x-coordinates of the input image corresponding to each pixel position (i, j) in the output image, and FIG. 9B shows an LUT storing the y-coordinates of the input image corresponding to each pixel position (i, j) in the output image.

For example, the pixel value of a pixel present on the position (0, 0) in the output image becomes the pixel value on a position (22.5, 43.7) of the input image. Further, the pixel value of a pixel present on a position (2, 1) in the output image becomes the pixel value on a position (23.5, 44.2) of the input image.

The pixel position of the input image corresponding to each pixel position in the output image is obtained by a distortion correction conversion expression described later. However, the pixel position of the input image is an integral value, and hence there is no pixel having an x-coordinate of 22.5 in practice. Therefore, a pixel value after conversion is calculated by performing a weighted average operation with this decimal part (Bi-Linear interpolation operation). The interpolation operation is described with reference to FIG. 10.

A case of obtaining the pixel value of the pixel present on the position (2, 1) in the output image is described. As described in detail, the pixel value of the pixel present on the position (2, 1) in the output image becomes the pixel value on the position (23.5, 44.2) of the input image.

Figure 10:
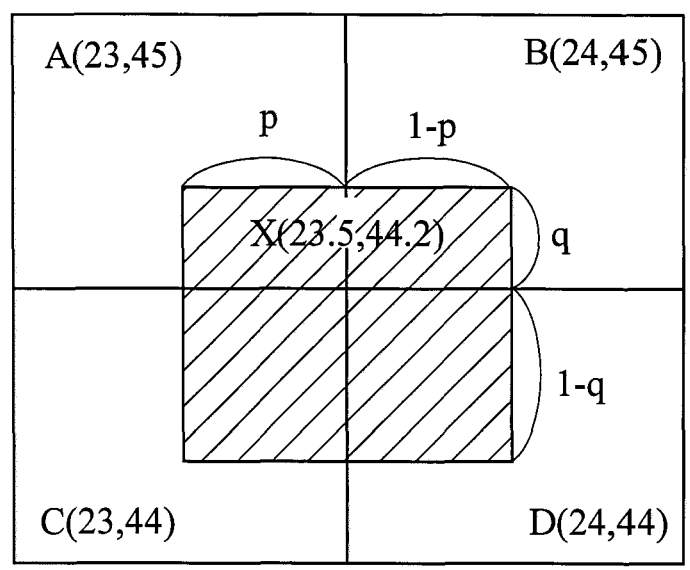
FIG. 10 is a schematic diagram for illustrating an interpolation arithmetic method.

Referring to FIG. 10, X denotes a virtual pixel corresponding to the position (23.5, 44.2) in the input image. A, B, C and D in FIG. 10 denote four pixels adjacent to the virtual pixel position (23.5, 44.2). The positions of the pixels A, B, C and D are (23, 45), (24, 45), (23, 44) and (24, 44) respectively.

Referring to FIG. 10, p denotes the absolute value of the difference between the x-coordinates of the pixel D and the virtual pixel X, and q denotes the absolute value of the difference between the y-coordinates of the pixel D and the virtual pixel X. In this example, p=0.5, and q=0.2. The pixel value of the virtual pixel X is calculated by the following expression (2), assuming that A, B, C and D represent the pixel values of the pixels A, B, C and D:

$$X = pqA + (1-p)qB + p(1-q)C + (1-p)(1-q)D \quad (2)$$

The distribution of the distortion correction level must be changed in response to setting of the camera 1 on the vehicle body. In this Example, the distribution of the distortion correction level is set with the calibration PC 50.

Distortion correction level adjustment software for setting the distribution of the distortion correction level is installed in the calibration PC 50. It is assumed that the calibration PC 50 and the CPU 22 of the drive assistance device are connected with each other through a communication cable.

Figure 11:
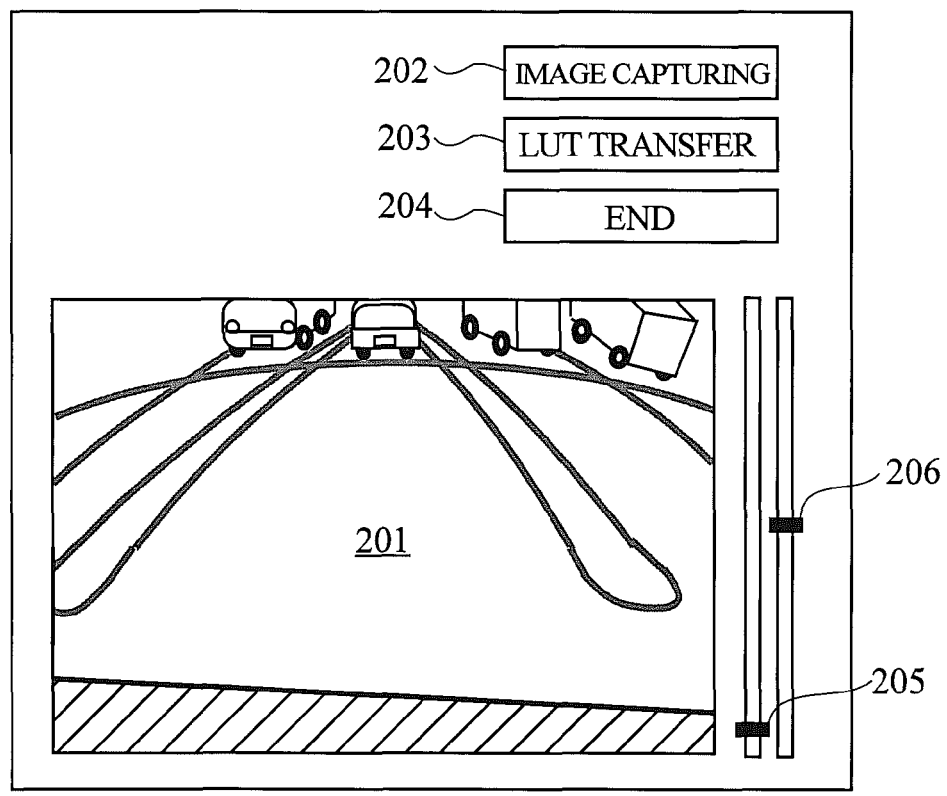
FIG. 11 is a schematic diagram showing an example of a distortion correction level adjustment screen displayed on a PC 50 when distortion correction level adjustment software is started.

FIG. 11 shows an example of a distortion correction level adjustment screen displayed on the PC 50 when the distortion correction level adjustment software is started.

Referring to FIG. 11, 201 denotes an image display region, 202 denotes an image capturing button, 203 denotes an LUT data transfer button, 204 denotes an end button, and 205 and 206 denote sliding keys. The sliding key 205 is a key for setting a boundary position u between the vehicle body portion and the portion close to the vehicle body. The sliding key 206 is a key for setting a boundary position s between the portion close to the vehicle body and the distant portion.

Figure 12:
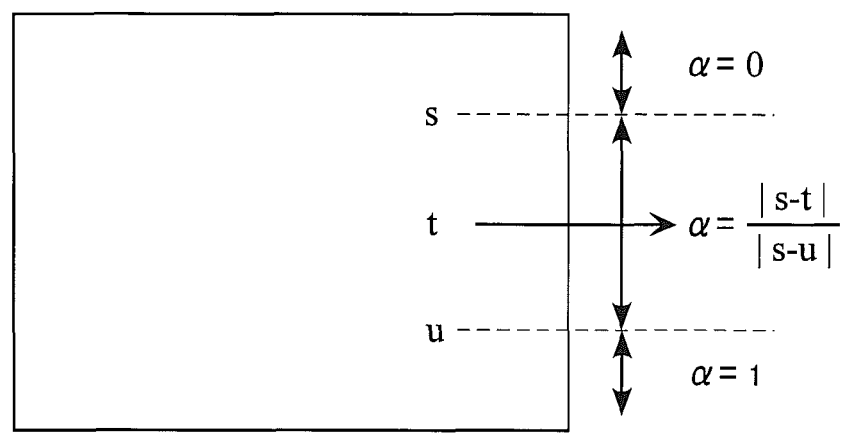
FIG. 12 is a schematic diagram showing the relation between boundary positions u and s and a coefficient α (0≤α≤1) controlling distortion correction level parameters.

FIG. 12 shows the relation between the boundary positions u and s and a coefficient α (0≤α≤1) controlling distortion correction level parameters.

In this Example, the distortion correction level is increased in the region (vehicle body portion) from the lower side of the screen up to the boundary position u. In other words, it is assumed that α=1.

In the region (region of the portion close to the vehicle body) between u and s, the distortion correction level is reduced as the distance from u is increased. In other words, it is assumed that α=|s−t|/|s−u|, assuming that t represents the distance from u.

In the region (distant portion) from s up to the upper side of the screen, no distortion correction is performed. In other words, it is assumed that α=0.

When the image capturing button 202 is pressed, an image picked up by the camera 1 is transferred to the calibration PC 50, and displayed on the image display region 201. The PC 50 creates LUT data for converting the input image to an image after distortion correction on the basis of the boundary positions u and s set by the sliding keys 205 and 206 and the distortion correction conversion expression described later, performs distortion correction on the input image on the basis of the created LUT data, and displays the image after the distortion correction on the image display region 201.

The operator sets the boundary positions u and s while confirming the effect of image conversion. When setting optimum boundary positions u and s, the operator presses the LUT data transfer button 203. Thus, the LUT data created by the PC 50 are transferred to the CPU 22 of the drive assistance device. The CPU 22 sets the LUT data transferred from the PC 50 on the LUT 21 of the lens distortion correction portion 2. The lens distortion correction portion 2 converts the input image to the distortion-corrected image using the coordinate association set in the LUT 21, and displays the obtained image on the monitor 3.

The lens distortion correction conversion expression employed in the case of creating the LUT data is described. As described in the "background technique", the coordinate positions (x', y') of the input image and the coordinate values (x, y) after the lens distortion correction are represented by the following expressions (3). In the expressions (3), $r^2 = x^2 + y^2$, where the xy coordinate system is a coordinate system with the origin set at the center of the image.

$$x' = x + x(k_1 r^2 + k_2 r^4) + 2p_1 xy + p_2 (r^2 + 2x^2)$$

$$y' = y + y(k_1 r^2 + k_2 r^4) + 2p_1 xy + p_2 (r^2 + 2y^2) \quad (3)$$

In order to adjust the distortion correction level, the four parameters $k_1$, $k_2$, $p_1$ and $p_2$ are multiplied by the coefficient α, thereby modifying the above expressions (3) as the expressions (4) and (5):

$$k'_1 = \alpha k_1$$

$$k'_2 = \alpha k_2$$

$$p'_1 = \alpha p_1$$

$$p'_2 = \alpha p_2 \quad (4)$$

$$x' = x + x(k'_1 r^2 + k'_2 r^4) + 2p'_1 xy + p'_2 (r^2 + 2x^2)$$

$$y' = y + y(k'_1 r^2 + k'_2 r^4) + 2p'_1 xy + p'_2 (r^2 + 2y^2) \quad (5)$$

$k'_1$, $k'_2$, $p'_1$ and $p'_2$ are modified distortion correction parameters, whose magnitudes vary with the value of α.

The coordinate system employed in this Example is the xy coordinate system with the origin at the lower left of the image as described with reference to FIGS. 8 and 9, and hence $X_{i,j} = x' + M/2$, $Y_{i,j} = y' + N/2$, $i = x + M/2$ and $j = y + N/2$ assuming that M represents the number of horizontal pixels of the input image and N represents the number of vertical pixels.

Therefore, the above expressions (5) can be represented as the following expressions (6). In the expressions (6), $r^2 = (i - M/2)^2 + (j - N/2)^2$.

$$X_{i,j} = (i - M/2) + (i - M/2)(k'_1 r^2 + k'_2 r^4) + 2p'_1 (i - M/2)(j - N/2) + p'_2 \{r^2 + 2(i - M/2)^2\} + M/2$$

$$Y_{i,j} = (j - N/2) + (j - N/2)(k'_1 r^2 + k'_2 r^4) + 2p'_1 (i - M/2)(j - N/2) + p'_2 \{r^2 + 2(j - N/2)^2\} + N/2 \quad (6)$$

In the case of assisting the sight of the driver, the lower portion of the image corresponds to the bumper portion and the upper portion of the image corresponds to the rear portion of the vehicle (front portion in the case of a front camera) in general. In consideration of the visibility of the driver, the bumper portion is desirably displayed as a straight line with no distortion. On the other hand, the rear portion of the vehicle (front portion in the case of the front camera) corresponding to the upper portion of the image is desirably displayed with the information content of the acquired image as undamaged as possible for the purpose of confirming safety.

In the lower portion of the image (portion where the value of j on the axis of ordinates of the distortion-corrected image is less than u in Example) corresponding to the bumper portion, therefore, the distortion correction level is set large (α=1), and a reference pixel position held in the LUT is calculated through the above expressions (4) and (6).

In the upper portion of the image (portion where the value of j on the axis of ordinates of the distortion-corrected image is greater than s in Example), the distortion correction level is set small ($\alpha=0$) in order to preserve the information content, and a reference pixel position held in the LUT is calculated through the above expressions (4) and (6).

In an intermediate portion (portion where the value of j on the axis of ordinates of the distortion-corrected image is t between u and s in Example), the distortion correction level is set stepwise ($\alpha=|s-t|/|s-u|$), and a reference pixel position held in the LUT is calculated through the above expressions (4) and (6). This is because the image cannot be smoothly connected between the upper portion and the lower portion and the visibility is reduced if the value of $\alpha$ is extremely fluctuated. According to this Example, the value of $\alpha$ is fluctuated stepwise on the intermediate portion of the image, thereby forming the distortion-corrected image maintaining the visibility. $\alpha$ is set in this manner, thereby forming an image where the strong level of lens distortion correction is applied to the lower portion of the image and no lens distortion correction is applied to the upper portion of the image.

Figure 13A:
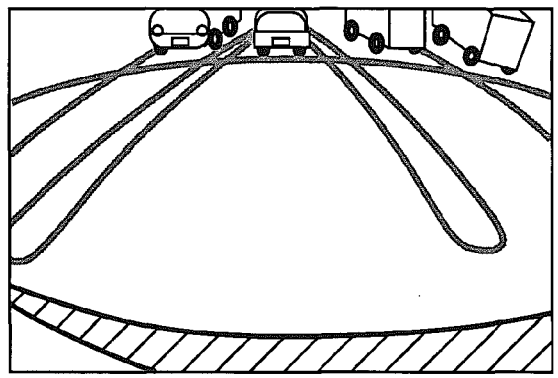
FIGS. 13A, 13B and 13C are schematic diagrams showing an input image, a total image obtained as a result of distortion correction according to this Example and an image cut out for display respectively.
Figure 13B:
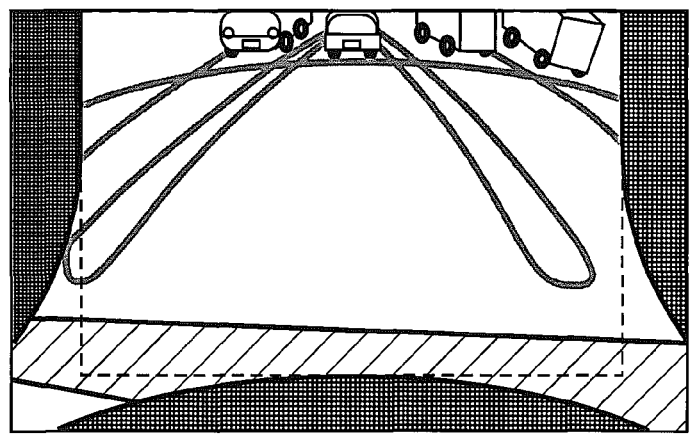
Figure 13C:
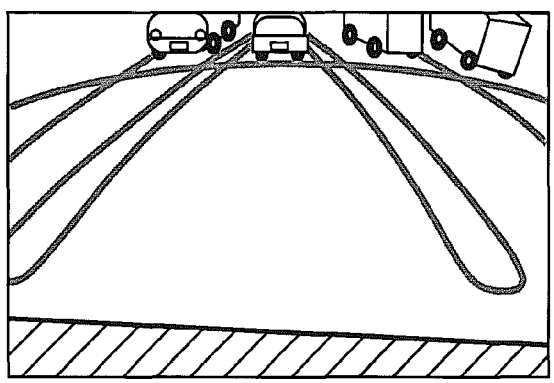

FIGS. 13A, 13B and 13C show the input image, the overall image as a result of performing the distortion correction according to this Example and an image cut out for display respectively.

The strong level of lens distortion correction is applied to the lower portion of the image, whereby the lower portion of the image is in a state more stretching than the display region of the input image. On the other hand, the upper portion of the image subjected to no lens distortion correction has the same image size as the input image. When forming the distortion-corrected cutout image, an inscribed region of the image region after conversion is cut out, and hence the image size in the horizontal direction is identical to that of the input image, while the size in the vertical direction is slightly larger than that of the input image. Therefore, the image must be reduced in the vertical direction and the aspect ratio of the image slightly changes, while the visibility is not remarkably influenced. As to the value of the reference pixel recorded in the LUT, the corresponding reference position may be recorded after adjusting (reducing) the cut-out image to the display image size. Alternatively, the reference position of the image before the cutout may be recorded in the LUT, so that processing such as enlargement or reduction is performed at the time of display.

The user sets the boundary line u between the vehicle body portion and the portion close to the vehicle and the boundary line s between the portion close to the vehicle and the portion far from the vehicle while confirming the effect on an adjustment screen of the PC 50. Every time u and s are set, the LUT data are calculated, and a distortion-corrected image with respect to the input image is formed through the LUT data and displayed.

When the user presses the LUT data transfer button 203, the LUT data formed in the PC 50 are transferred to the CPU 22 in the lens distortion correction portion 2 of the drive assistance device, and set in the LUT 21 in the lens distortion correction portion 2. After the LUT data are set in the LUT 21, the lens distortion correction portion 2 performs distortion correction on the input image from the camera 1 with the coordinate association set in the LUT 21, and displays the obtained distortion-corrected image on the monitor 3. After the LUT data are set in the LUT 21, the calibration PC 50 is detached.

The side of the drive assistance device may be provided with the same function as the distortion correction level adjustment function by the aforementioned calibration PC 50.

[2] Example 2

In the case of using the PC for parameter adjustment of distortion correction as in Example 1, the coordinate association between the input image and the output image can be calculated in a short time (about 100 msec. in a Pen 4 machine) due to the calculability of the PC, and the effect of the lens distortion correction can be confirmed generally in real time. In order to perform this calculation in a CPU having relatively low calculation power built in the lens distortion correction portion 2 of the drive assistance device, a long calculation time is required.

Example 2 renders the effect confirmable through simple operation in a case of performing parameter adjustment of distortion correction on the side of the drive assistance device. According to Example 2, distortion correction level adjustment software for setting u and s on the side of the drive assistance device and simply on-screen-displaying distribution of distortion correction level responsive to the set u and s is installed.

When u and s are set on the side of the drive assistance device, the CPU 22 of the drive assistance device expresses the distribution of the distortion correction level responsive to the set u and s in grid lines without calculating input/output coordinates of the overall screen, i.e., without calculating LUT data. When the operator inputs an LUT creation instruction after confirming the effect, the CPU 22 creates LUT data responsive to the set u and s, and sets the same in the LUT 21. The method of creating the LUT data is similar to that in Example 1.

Figure 14:
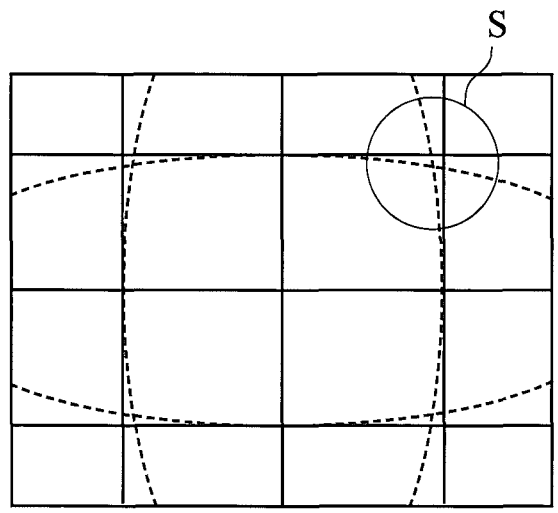
FIG. 14 is a schematic diagram showing an example of a grid for simply showing distribution of distortion correction level.

FIG. 14 shows an example of a grid for simply showing the distribution of the distortion correction level.

The solid lines in FIG. 14 show grid lines in a case of setting $\alpha=1$ with respect to the overall image. The broken lines in FIG. 14 show grid lines in a case of setting $\alpha=0$ (no distortion correction) with respect to the overall image. The grid lines also include shapes formed by bending normal linear grid lines.

Figure 15:
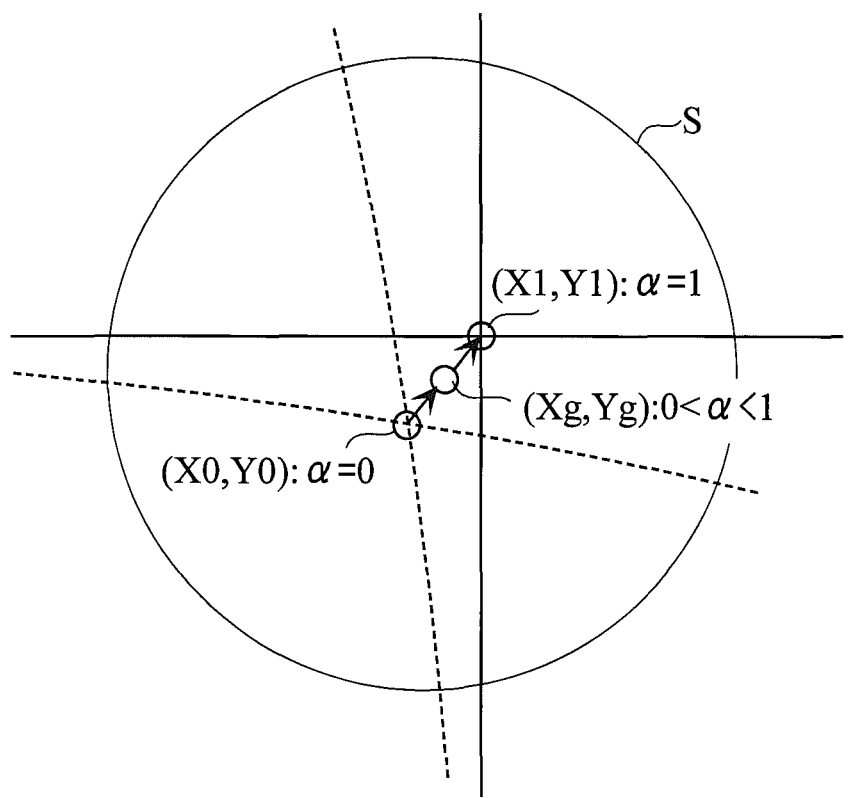
FIG. 15 is a schematic diagram for illustrating a method of calculating coordinate values corresponding to respective correspondence points from coordinate values on a grid in a case of setting α=1 to the overall image in response to a set value of α.

The grid (lattice pattern) in the case of setting $\alpha=1$ with respect to the overall image is previously preserved. Then, coordinate values corresponding to respective correspondence points are calculated and displayed from the coordinate values on the grid in the case of setting $\alpha=1$ with respect to the overall image in response to the set value of $\alpha$. The method of calculating the correspondence points is described with reference to FIG. 15. FIG. 15 is an enlarged view of a portion denoted by S in FIG. 14.

Referring to FIG. 15, it is assumed that the coordinates of a point on the grid in the case of $\alpha=1$ are (X1, Y1), and the coordinates of a reference point (point on an original image referred to as the coordinate values of (X1, Y1)) on the original image (input image) are (X0, Y0). The coordinate values (X0, Y0) of the reference point on the original image match a correspondence point on the grid (grid in the case of $\alpha=0$) in the case of performing no distortion correction.

The coordinates (Xg, Yg) of $0 \leq \alpha \leq 1$ are represented by the following expressions (7):

$$Xg = X0 + \alpha(X1 - X0)$$

$$Yg = Y0 + \alpha(Y1 - Y0) \qquad (7)$$

When the point on the grid in the case of α=1 is expressed in (i, j), the coordinate values (X0, Y0) are represented by the following expressions (8) by substituting α=1 in the above expressions (4) and (6):

$$X0=(i-M/2)+(i-M/2)(k_1 r^2+k_2 r^4)+2p_1(i-M/2)(j-N/2)+p_2\{r^2+2(i-M/2)^2\}+M/2$$

$$Y0=(j-N/2)+(j-N/2)(k_1 r^2+k_2 r^4)+2p_1(i-M/2)(j-N/2)+p_2\{r^2+2(j-N/2)^2\}+N/2 \quad (8)$$

The coordinate values (X1, Y1) are those of the point on the grid in the case of α=1, and hence the following expressions (9) hold:

$$X1=i$$

$$Y1=j \quad (9)$$

The following expressions (10) are found by substituting the above expressions (8) and (9) in the above expressions (7):

$$Xg=i+(1-\alpha)[(i-M/2)(k_1 r^2+k_2 r^4)+2p_1(i-M/2)(j-N/2)+p_2\{r^2+2(i-M/2)^2\}]$$

$$Yg=j+(1-\alpha)[(j-M/2)(k_1 r^2+k_2 r^4)+2p_1(i-M/2)(j-N/2)+p_2\{r^2+2(j-M/2)^2\}] \quad (10)$$

A grid having a shape responsive to the set a can be formed and on-screen-displayed by converting the coordinate values on the previously preserved grid lines in the case of α=1 to the coordinate values responsive to the set a through the above expressions (10).

Figure 16A:
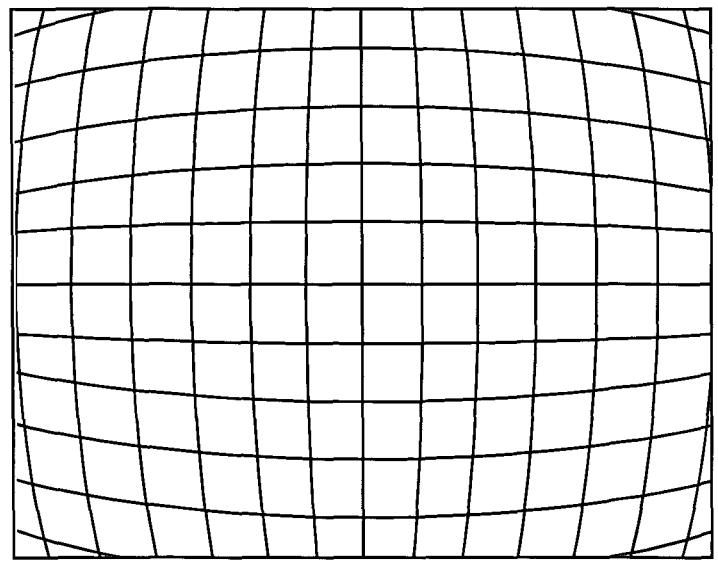
FIGS. 16A and 16B are schematic diagrams showing an example of a grid in a case of no distortion correction (α=0) and an example of a grid showing distribution of distortion level created on the basis of set u and s.
Figure 16B:
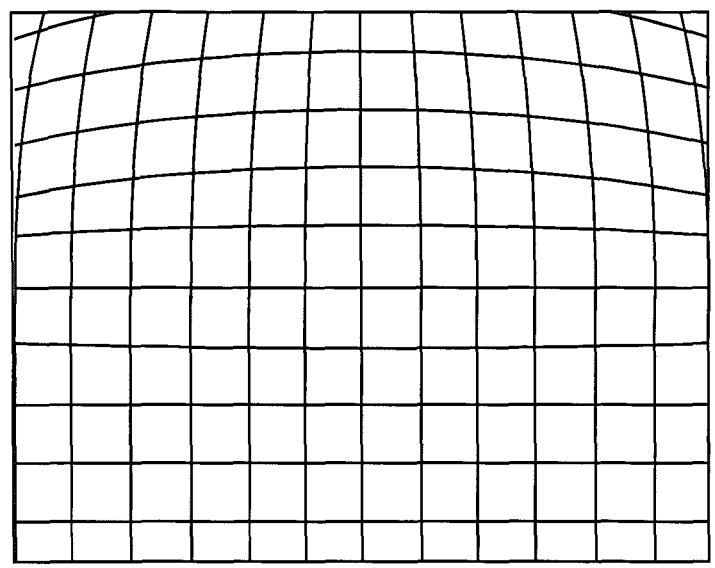

FIG. 16A shows an example of a grid in a case of no distortion correction (α=0), and FIG. 16B shows an example of a grid showing distribution of distortion level created on the basis of set u and s. The level of the distortion correction can be expressed by changing the line types or colors of the grid lines.

It is possible to reduce the amount of calculation by limiting a region for previously calculating the effect of distortion correction onto the grid. It is possible to previously predict the effect before calculating the LUT by displaying the shape of the grid on the monitor through the OSD function. Further, it is also possible to visually confirm dispersion of the optical system in production and the operation of the circuit of the distortion correction portion through this function.

According to the aforementioned Examples, it is possible to obtain an image well-balanced between a distortion feeling of the image and the diagonal information in response to the setting of the camera on the vehicle body. Further, it is possible to individually cope with various types of vehicles only through change of data, without re-designing the optical system requiring initial investment.

According to the present invention, an input image is divided into a plurality of regions so that distortion correction level can be varied with the respective regions in a case of performing lens distortion correction on the input image.

The invention claimed is:

1. A drive assistance device comprising:
   an imaging device mountable on a vehicle body for capturing an input image of a part of the vehicle body and a region surrounding the vehicle body;
   lens distortion correction device for performing lens distortion correction on an input image captured by the imaging device, the input image having a plurality of pixels arranged in rows and columns; and
   a display for displaying a corrected input image created by the lens distortion correction device,
   wherein the lens distortion correction device:
      divides the input image into:
         a first input image section including the part of the vehicle body, the first input image section having multiple first input image section pixel rows; and
         one or more additional input image sections, each one or more additional input image section having multiple additional input image section pixel rows; and
      performs a first lens distortion correction on the first input image section and a separate lens distortion correction on each of the one or more additional input image correction sections
         wherein, the one or more additional image sections are based, at least in part, on the distance of the vehicle surrounding region included in the additional image section from the vehicle body and the angle of depression of the imaging device used to capture the additional image section;
         wherein, the first input image section lens distortion correction is constant in strength and is equal to or greater than the one or more additional input image section lens distortion correction.

2. A drive assistance device comprising:
   an imaging device mountable on a vehicle body for capturing an input image of a part of the vehicle body and a region surrounding the vehicle body;
   a lens distortion correction device for performing lens distortion correction on an input image captured by the imaging device, the input image having a plurality of pixels arranged in rows and columns; and
   a display for displaying a corrected input image created by the lens distortion correction device,
   wherein the lens distortion correction device:
      divides the input image into:
         a first input image section including the part of the vehicle body, the first input image section having multiple first input image section pixel rows; and
         a plurality of additional input image sections, each of the plurality of additional image sections having multiple additional input image section pixel rows, and
      performs a first lens distortion correction on the first input image section and a separate lens distortion correction on each of the plurality of additional input image sections wherein a level of distortion correction varies depending based on the input image section such that:
         for the first input image section, the level of distortion correction is equal to or stronger than a strongest distortion correction level for any of the plurality of additional input image sections, as well as constant in strength; and
         for the additional input image that is most distant from the vehicle body, the level of distortion correction is equal to or weaker than the weakest distortion correction level of the distortion correction levels of any of the other plurality of additional input image sections, as well as constant in strength;
         for each of the plurality of additional input image sections not most distant from the vehicle body, the level of distortion is weaker the further the additional input image is from the first input image.

3. A drive assistance device comprising:
   an imaging device mountable on a vehicle body for capturing an input image of a part of the vehicle body and a region surrounding the vehicle body;

a lens distortion correction device for performing lens distortion correction on the input image captured by the imaging device, the input image having a plurality of pixels arranged in rows and columns; and a display for displaying a corrected input image created by the lens distortion correction device, wherein the lens distortion correction device:

divides the input image into:

a first input image section including the part of the vehicle body, the first input image section having multiple first input image section pixel rows; and one or more additional input image sections, each one or more additional image section having multiple additional input image section pixel rows; and performs a first lens distortion correction on the first input image section and a separate lens distortion correction on each of the one or more additional input image correction sections;

wherein, the one or more additional image sections are based, at least in part, on the distance of the vehicle surrounding region included in the additional input image section from the vehicle body and the angle of depression of the imaging device used to capture the additional image section;

wherein, the first input image section lens distortion correction is constant in strength and is equal to or greater than the one or more additional input image section lens distortion correction.

4. The drive assistance device according to any one of claim 1, 2, or 3, comprising region setting unit for setting the first input image section and the one or more additional input image sections; and distortion correction level decision unit for deciding a corresponding distortion correction level for an input image section set by the region setting unit, wherein the lens distortion correction unit performs lens distortion correction based at least in part on the corresponding distortion correction level for the respective region decided by the distortion correction level decision unit on the input image.

5. The drive assistance device according to any one of claim 1, 2, or 3, comprising temporary input image section setting unit for temporarily setting the the first input image section and the one or more additional input image sections;

temporary distortion correction level decision unit for temporarily deciding a temporary distortion correction level for an input image section temporarily set by the temporary region setting-unit, a display unit configured to display an effect of distortion correction, based at least in part on the temporary distortion correction level for the input image section temporarily decided by the temporary distortion correction level decision unit, on the display with grid lines, and formal setting unit for formally setting the temporary distortion correction level for the input image section temporarily decided by the temporary distortion correction level decision unit as an intrinsic distortion correction level for the input image section, wherein the lens distortion correction device performs lens distortion correction based at least in part on the intrinsic distortion correction level for the input image section formally set by the formal setting unit on the input image.

* * * * *